United States Patent [19]

Smith

[11] 3,819,915

[45] June 25, 1974

[54] METHOD AND APPARATUS FOR CONTROLLING THE CURE OF A RUBBER ARTICLE

[75] Inventor: Thomas W. Smith, Akron, Ohio

[73] Assignee: McNeil Corporation, Akron, Ohio

[22] Filed: Sept. 17, 1973

[21] Appl. No.: 398,541

[52] U.S. Cl. ................ 235/151, 235/151.1, 264/40, 264/326, 425/29

[51] Int. Cl. .......................... G06f 15/46, B29h 5/02

[58] Field of Search .............. 235/150.1, 151, 151.1; 264/40, 326; 425/29, 50, 135, 143, 144

[56] References Cited

UNITED STATES PATENTS

| | | | |
|---|---|---|---|
| 3,443,280 | 5/1969 | Hugger | 264/40 X |
| 3,649,729 | 3/1972 | Davis et al. | 264/40 |
| 3,659,974 | 5/1972 | Neugroschi | 264/40 X |
| 3,718,721 | 2/1973 | Gould et al. | 264/40 |

*Primary Examiner*—Malcolm A. Morrison
*Assistant Examiner*—Jerry Smith
*Attorney, Agent, or Firm*—Hamilton, Renner & Kenner

[57] ABSTRACT

Disclosed is an apparatus and method for controlling the cure of a rubber compound according to the cross-link concentration thereof. The method and apparatus recognizes that most cures can be divided into two distinct reaction periods, an induction period where little, if any, cross-linking of the molecular structure occurs and a cross-linking period where the majority of the chemical vulcanization reaction occurs, and controls the cure accordingly. Based on signals from a temperature sensitive probe embedded in the rubber, the induction time period is calculated using the Arrhenius equation and a known activation energy. This calculated induction time is compared to a predetermined value and upon a match, calculation of the percent cross-link concentration is initiated using a known activation energy and compared with a predetermined percentage cross-link value. When the rubber compound is cured to the desired percentage of cross-link concentration, the curing process can be terminated.

17 Claims, 2 Drawing Figures

PATENTED JUN 25 1974 3,819,915

METHOD AND APPARATUS FOR CONTROLLING THE CURE OF A RUBBER ARTICLE

BACKGROUND OF THE INVENTION

This invention relates to a method and apparatus for controlling the heat cure of a rubber article according to the state of the cure. More particularly, this invention relates to a method and apparatus for controlling the cure based on the percentage of cross-linking of the molecular structure of the rubber compound.

Rubber articles, such as pneumatic tires, for years have been vulcanized or cured in a press wherein heat is applied both externally and internally of the tire mold for a certain length of time to effect the chemical vulcanization reaction in the tire. Rubber chemists were faced with the problem of predicting the time period within which each particular type of rubber compound would be satisfactorily cured and once such a time period was established, the tire would be arbitrarily heated for that precise period. While such time control has been used to cure millions of tires, because of the varying properties of the rubber even within the same compound, some tires are slightly overcured while others are slightly undercured. Although neither undercuring nor overcuring is desirable with respect to the quality of the end product, unnecessary overcuring is particularly undesirable because production time on the valuable capital vulcanizing machinery is thereby wasted. Thus, the rubber industry was faced with a severe problem of producing a better quality tire in an ideal time period. Only knowing the precise state of the chemical cure reaction would help to solve that problem.

Recently various devices have been developd which represent first attempts at solving the problem. In one type of apparatus, a temperature sensitive probe, such as a thermocouple, is inserted into the tire at the time of the initiation of the heat cure cycle. The temperature signals are used as an input for calculations based on the Arrhenius expression governing the chemical vulcanization reaction which result in determining the state of the cure in terms of equivalent cure time at a reference temperature. The length of the cure is then governed by comparing the elapsed cure equivalents with an empirically determined standard to control the length of the cure, usually a far better meter than elapsed time.

Other devices operate similarly in that elapsed cure equivalents are used as the meter but do not utilize a probe internally of the tire to generate the temperature signal. Rather, the heat transfer characteristics of a particular rubber compound are simulated by a network of resistors and capacitors with actual temperature measurements being taken only at the boundaries of the tire. While this method avoids the necessity of having to embed a probe in the tire, the accuracy of the simulated network is far less than the first described method.

In either method, it is required that the rubber chemist dictate the desired length for an optimum cure in terms of cure equivalent units at a reference temperature. To make this determination, the rubber chemist generally uses an instrument such as a rheometer to measure the mechanical property changes of a sample rubber during a laboratory cure thereof. These instruments determine the cross-link concentrations as well as such cure parameters as activation energy, induction time (that is, the time period where heat is applied but no cross-linking takes place) and time for a given cure state at a constant temperature. The cure equivalent units necessary for the optimum cure are then determined based on the desired amount of cross-link concentration based on the rheometer tests. If a new cross-link concentration is desired, the change must first be translated into cure equivalent units in order for the prior art devices described above to be operable. Thus, no existing cure control method or apparatus utilizes the cross-link concentration factor for direct optimization of the curing process.

These prior art devices can also be said to be deficient in other respects. The cure of rubber, as defined by the change in mechanical properties such as tensile strength, shear modulus and the like, is nonlinear with respect to time and temperature. For example, a tire may undergo a change in modulus from minimum to maximum only during the last few minutes of a cure in a press wherein the rubber temperature is continuously increasing. The prior art devices ignore this fact and linearize the cure in that cure equivalent units are accumulated at a constant rate at a constant temperature. Therefore it is impossible to use the prior art methods to determine the actual state of cure at any time during the cure or to preset the control to a different desired state of cure. In addition, these prior art devices assume a single value of activation energy for use in the Arrhenius function in calculating cure equivalent units, whereas in actual practice two different activation energies are associated with the two cure reaction periods — induction and cross-linking.

SUMMARY OF THE INVENTION

It is thus an object of the present invention to provide a method and apparatus for optimizing the cure of a rubber compound directly according to the percentage of cross-linking thereof.

It is another object of the present invention to provide a method and apparatus, as above, which accounts for the induction reaction period where little if any cross-linking occurs.

It is still another object of the present invention to provide a method and apparatus, as above, which utilizes precise activation energies for the induction reaction period and cross-linking period to calculate the percentage of cross-linking.

It is a further object of the present invention to provide a method and apparatus, as above, which accounts for the nonlinear characteristics of the change in mechanical properties of the rubber during cure with respect to time and temperature.

These and other objects of the present invention which will become apparent from the following description are accomplished by improvements hereinafter described and claimed.

In general, according to the method and apparatus of the present invention, a temperature sensitive probe is inserted into the tire at approximately the same time as the initiation of the heat cure thereof. An electrical signal from the probe related to the internal rubber temperature is used as input to circuitry which utilizes the Arrhenius equation with a predetermined activation energy to calculate the induction reaction period. The calculated induction reaction period is compared with a predetermined value and upon a match, the signal related to temperature is transferred to circuitry which calculates the state of cure in terms of percent of cross-link concentration based on predetermined values of activation energy and cross-link time constant. The calculated percentage of cross-link concentration is compared with the desired value and upon a match thereof the cure may be terminated.

DESCRIPTION OF THE PREFERRED EMBODIMENT

Figure 1:
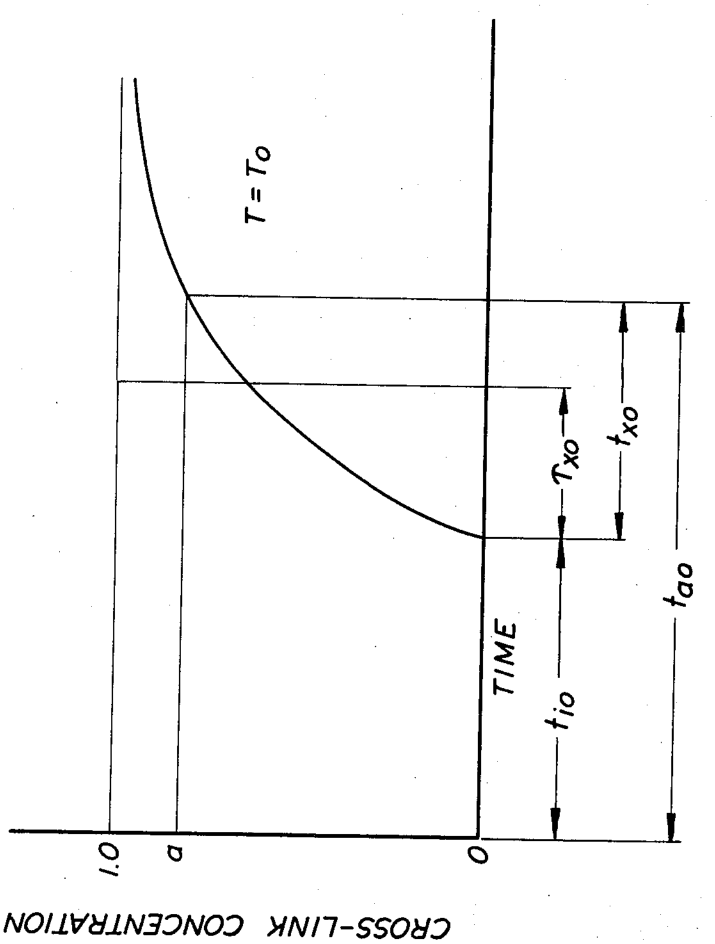
FIG. 1 is a graph of percent cross-link concentration versus time and typifies the behavior of the mechanical property change of rubber during the cure thereof.

A typical curve of the state of the cure, as measured in terms of percentage of cross-link concentration, is plotted versus time in FIG. 1. Such curves are commonly empirically obtained in the rubber industry by curing rubber samples in testing equipment such as a conventional rheometer. The samples are cured at a constant temperature, $T_o$, which may be any convenient temperature such as 300° F, a temperature used as a standard for determining cure equivalents. From the curve it is noted that no cross-linking occurs until a time designated $t_{io}$, the induction time at temperature $T_o$, has elapsed. Thereafter the curve proceeds exponentially until 100 percent cross-linking is approached. The time designated $t_{ao}$ is the total time to obtain a specified state of cure or percentage cross-link, $a$. The time, $t_{xo}$, is the time of the cross-linking period, that is, the time measured from the end of the induction period until cross-link percentage, $a$, is achieved, or, $t_{ao} - t_{io}$.

Other useful parameters can also be determined from FIG. 1. For example, the cross-link time constant, $\tau_{xo}$, which by definition is the time in which the cross-link curve reaches $1 - 1/e$ of its full extent, can be determined. In addition, those skilled in rheometer curve analysis can readily determine activation energies by running two rheometer tests at different temperatures $T_o$ and $T_1$ and utilizing the Arrhenius function for cure rates, $e^{\alpha(1/T_0 - 1/T_1)}$ where $\alpha$ is the activation energy E divided by the universal gas constant. From the test curves, the ratios of the time to reach $t_{io}$, $t_{xo}$ and $t_{ao}$ between the tests run at temperatures $T_o$ and $T_1$ as well as the gas constant would be known, thus leaving E as the only unknown. Thus, an activation energy for the induction reaction time period $E_{Ai}$, or the cross-linking reaction time period, $E_{Ax}$ can be ascertained. As will hereinafter be described, the values and parameters determinable from the curve of FIG. 1, such as $\tau_{xo}$, $E_{Ai}$, $E_{Ax}$, $t_{io}$, and $t_{xo}$ can be used to control an actual cure according to the method and apparatus of the present invention.

Because cross-linking reactions are generally first order, the mechanical properties follow an exponential increase after time $t_{io}$ such that $$a = 1 - e^{-(t_{ao} - t_{io}/\tau_{xo})} \quad (1)$$

Solving Equation (1) for $t_{ao}$:

$$t_{ao} = t_{io} + \tau_{xo} \ln (1/1 - a) \quad (2)$$

Because $t_{ao} = t_{io} + t_{xo}$, mere substitution into Equation (2) indicates that $$t_{xo} = \tau_{xo} \ln (1/1 - a) \quad (3)$$

From the Arrhenius relationship with temperature varying as a function of time $$t_{io} = \int_0^{t_i} e^{\alpha_i(1/T_0 - 1/T)} dt \quad (4)$$

and $$t_{xo} = \int_{t_i}^{t_x + t_i} e^{\alpha_x(1/T_0 - 1/T)} dt \quad (5)$$

where $\alpha_i$ and $\alpha_x$ are $E_{Ai}$ and $E_{Ax}$, respectively, divided by the universal gas constant. Therefore $$t_{ao} = \int_0^{t_i} e^{\alpha_i(1/T_0 - 1/T)} dt + \int_{t_i}^{t_i + t_x} e^{\alpha_x(1/T_0 - 1/T)} dt \quad (6)$$

By substituting Equation (5) into Equation (3) it may be determined that $$\ln\left(\frac{1}{1-a}\right) = \frac{1}{\tau_{xo}} \int_{t_i}^{t_x + t_i} e^{\alpha_x(1/T_0 - 1/T)} dt \quad (7)$$

Actual cures of rubber in a tire vulcanizing press, for example, can be controlled based on the above equations and calculations. Contemporaneous with or shortly after the closing of the vulcanizing press and initiation of the heating cycle, a temperature sensitive probe, such as a thermocouple, thermistor or the like can be introduced into the tire, preferably at the point of slowest curing and the integral of $e^{\alpha_i(1/T_0 - 1/T)}dt$ can be evaluated until time $t_{io}$ is reached. The values for $t_{io}$, and $\alpha_i$ are, of course, determined from test curves such as shown in FIG. 1 with the value of $T_o$ being arbitrarily selected as a standard for a particular cure and the value of T coming from the temperature sensitive probe.

When time $t_{io}$ is reached, the integral of $e^{\alpha_x(1/T_0 - 1/T)} dt$ divided by $\tau_{xo}$ is evaluated with $\tau_{xo}$ and $\alpha_x$ also being determined from the test curve as previously described herein. The value of this integral can be converted to the cross-link concentration, $a$, in percent by utilizing the relationship defined in Equation (7). Then, when the value for a reaches the preselected state of cure value, the cure may be terminated knowing that the point in contact with the probe internally of the tire has been cured to the desired cross-linking percentage.

Figure 2:
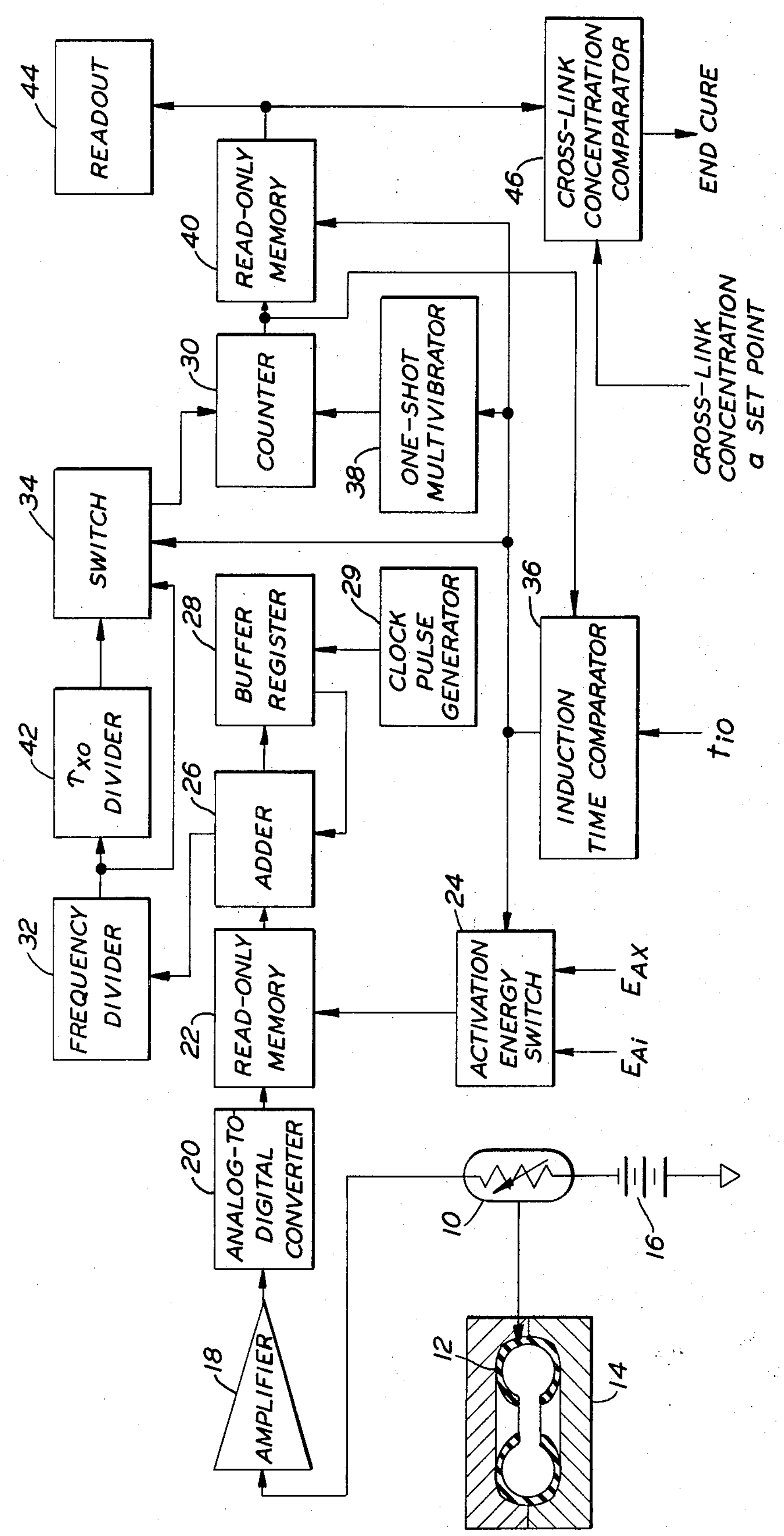
FIG. 2 is a block diagram of the apparatus which performs the method of controlling the cure of a rubber article according to the present invention.

The apparatus which accomplishes such a cure control is shown in block form in FIG. 2. A temperature sensitive probe which, as described above, can be a thermocouple, is shown in FIG. 2 as a thermistor probe 10 which is insertable into a tire 12 through molds 14 of a standard tire curing press in a conventional manner. The probe 10 is preferably inserted into tire 12 just after the molds 14 close. A constant voltage from source 16 is maintained across thermistor 10 so that a signal related to a known function of temperature of a selected point internally of the tire is sent to an amplifier 18 to be magnified into a range usable for the remainder of the circuitry.

The amplified temperature signal, representative of T in the above equations, is preferably then converted to a binary number in a conventional analog-to-digital converter 20. The binary signal out of converter 20 is fed to a conventional read-only memory circuit 22 which is programmed to convert the temperature dependent input signal as well as an activation energy input signal into the corresponding value of the Arrhenius cure rate $e^{\alpha_i(1/T_0-1/T)}$ in binary numbers such that the least significant bit represents 0.02 minutes $^{-1}$ of cure rate, based upon the rheometer test temperature for convenience. The activation energy input signal is transferred to the read-only memory 22 through switch 24 which in its initial condition permits the induction period activation energy $E_{Ai}$ to be fed to memory 22. The cross-linking activation energy $E_{Ax}$ is also presented to switch 24 and at a later time in the control sequence fed to memory 22 in a manner to be hereinafter described.

The output of the read-only memory 22 is integrated in a conventional manner by circuitry consisting of a digital adder 26, a buffer register 28, a clock pulse generator 29 and a counter 30, all standard items well known to one of ordinary skill in the art. A frequency divider 32 is switched into the circuit through electronic switch 34 to scale the output of counter 30 in tenth minute increments. The output of counter 30 which is a signal proportional to the value of the integral of $e^{\alpha_i(1/T_0-1/T)}$ in tenth minutes is presented to an induction time comparator 36. Comparator 36 is also provided with a reference signal corresponding to the value of $t_{io}$ determined from the test curve of FIG. 1. Upon a match of the signal from counter 30 and the predetermined $t_{io}$ value, comparator 36 delivers a signal to switch 24, switch 34, one-shot multivibrator 38 and read-only memory 40 to convert the circuitry so that the cross-link concentration is calculated and used to control the cure in the following manner.

The signal to switch 24 transfers the activation energy input to read-only memory 22 from $E_{Ai}$ to $E_{Ax}$ so that memory 22 will develop the cure rate $e^{\alpha_x(1/T_0-1/T)}$. The signal to switch 34 switches the divide by $\tau_{xo}$ divider 42 into the circuit. The one-shot multivibrator resets counter 30 and the signal to read-only memory 40 enables that circuitry so that cross-link concentration can be calculated. Adder 26, buffer register 28 and counter 30 will now calculate the integral of $e^{\alpha_x(1/T_0-1/T)}$ divided by $\tau_{xo}$ (as determined from test curves such as shown in FIG. 1) such that the output of the counter is proportional to $\ln(1/1-a)$ according to Equation (7).

Read-only memory 40 now receives this signal from counter 30 and is programmed to solve the equation $a = 1 - e^{-x}$ where $x$ is the output of counter 30. The output of memory 40 thus converts the integral of the Arrhenius function divided by $\tau_{xo}$ into a signal proportional to the cross-link concentration a in percent. The a signal may be visually displayed or indicated by a readout device 44 and is also fed to cross-link concentration comparator 46 which performs the function of comparing the calculated value for a from memory 40 with the desired percent of cure a preset into the comparator 46. Upon a match of these values, comparator 46 presents an output signal which ends the heat curing cycle, the tire thus having been cured to precisely the desired amount of cross-link concentration.

The effect of the apparatus and method according to the present invention on a representative cure of a passenger tire is illustrated by the data in Table I.

TABLE I

| (1) $t$ (min) | (2) T °F | (3) $e^{\alpha_i(1/T_0-1/T)}$ | (4) $e^{\alpha_x(1/T_0-1/T)}$ | (5) ROM 22 output | (6) Counter input freq. (PPM) | (7) $t_{io}$ counter output | (8) $10\ln\left(\frac{1}{1-a}\right)$ counter output | (9) $a$ percent ROM 40 output | (10) Actual equiv. min. | (11) $E_{Ai}$ equiv. min. | (12) $E_{Ax}$ equiv. min. |
|---|---|---|---|---|---|---|---|---|---|---|---|
| 4 | 209 | .012 | | 1 | .2 | 0 | | 0 | .012 | .012 | .025 |
| 5 | 239 | .047 | | 2 | .4 | 1 | | 0 | .06 | .06 | .10 |
| 6 | 262 | .127 | | 6 | 1.2 | 2 | | 0 | .19 | .19 | .28 |
| 7 | 279 | .254 | | 13 | 2.6 | 4 | | 0 | .44 | .44 | .60 |
| 8 | 293 | .44 | | 22 | 4.4 | 9 | | 0 | .88 | .88 | 1.11 |
| 9 | 302 | .619 | | 31 | 6.2 | 15 | | 0 | 1.50 | 1.50 | 1.78 |
| 10 | 310 | | .859 | 43 | 2.867 | | 3 | 26 | 2.36 | 2.33 | 2.64 |
| 11 | 316 | | 1.031 | 52 | 3.467 | | 6 | 45 | 3.39 | 3.37 | 3.67 |
| 12 | 320 | | 1.162 | 58 | 3.867 | | 10 | 63 | 4.55 | 4.57 | 4.83 |
| 13 | 323 | | 1.27 | 64 | 4.267 | | 14 | 75 | 5.82 | 5.90 | 6.10 |
| 14 | 326 | | 1.388 | 69 | 4.60 | | 19 | 85 | 7.21 | 7.38 | 7.49 |
| 15 | 328 | | 1.471 | 74 | 4.933 | | 24 | 91 | 8.68 | 8.97 | 8.96 |
| 16 | 329 | | 1.515 | 76 | 5.067 | | 29 | 94 | 10.20 | 10.62 | 10.47 |
| 17 | 329 | | 1.515 | 76 | 5.067 | | 34 | 97 | 11.71 | 12.26 | 11.99 |
| 18 | 330 | | 1.56 | 78 | 5.2 | | 39 | 98 | 13.27 | 13.97 | 13.55 |

$T_0$=315° F.; $E_{Ai}$=24 K-cal./mole; $E_{Ax}$=20 K-cal./mole; $t_{io}$=1.5 min.; $\tau_{xo}$=3.0 min.

Table I assumes a rheometric test temperature $T_o$ of 315° F., an $E_{Ai}$ of 24, an $E_{Ax}$ of 20, a $t_{io}$ of 1.5 minutes and a $\tau_{xo}$ of 3 minutes as the values obtained from typical test rheometer curves. Column 1 indicates the elapsed cure time in real minutes with Column 2 indicating the temperature internally of the tire as sensed by probe 10. Columns 3 and 4 are the theoretical values of the Arrhenius cure rate utilizing the induction and cross-link activation energies respectively. The binary number appearing at the output of memory 22 and representing the cure rate is shown in Column 5. The sixth column represents the value of the pulse frequency presented to the counter 30 which then accumulates the total number of pulses each representing a tenth minute of the induction reaction period shown in Column 7 until $t_{io}$ is matched. Then the output of counter 30 represents $10\ \ln(1/1-a)$ as shown in column 8. The output of memory 40 showing the precentage of cross-link concentration a is tabulated in Column 9.

The last three columns of Table I are shown for comparison reference only and do not relate to items directly calculated for control purposes by the method and apparatus of the present invention. The Column headed "Actual Cure Equiv." represents the calculated value of cure equivalents at the reference temperature utilizing the different activation energies for induction and cross-linking reaction periods. The next column indicates the number of cure equivalents which would have been accumulated if the induction reaction activation energy had been used through the entire cure, with the last column indicating the number of cure equivalents accumulated if the cross-linking reaction activation energy were used for the entire cure. The inaccuracy of prior art devices which control cures according to cure equivalents and a single activation energy is apparent. If the induction reaction activation energy is chosen, 13.97 cure equivalent units would be accumulated after 18 minutes. Similarly, if the cross-linking reaction activation energy is chosen, 13.55 cure equivalent units would be accumulated after 18 minutes. For practical purposes, in these prior art devices, a compromise activation energy would probably be selected with a resultant compromise cure equivalent amount accumulating. However, using the precise activation energies for both periods according to the disclosed method and apparatus, 13.27 cure equivalent units are accumulated, a number below any of the others, even a compromise value.

It should thus be apparent that a device constructed according to the present invention to perform the method of the present invention represents a substantial improvement in the art of controlling the cure of a rubber compound by not only dictating the length of the cure based on percentage of actual cross-linking but also by utilizing precise values for rubber activation energies.

What is claimed is:

1. A method of controlling the cure of a rubber article according to the cross-link concentration thereof, said cure including an induction reaction period wherein essentially no change in the mechanical properties of the rubber occurs and a cross-linking reaction period wherein cross-linking of the rubber occurs, comprising the steps of initiating the cure by applying heat to the rubber, sensing a known function of the temperature of the rubber, calculating therefrom the induction reaction period, comparing the calculated induction reaction period with a predetermined induction reaction period, upon a match of the calculated and predetermined induction reaction periods calculating from the known function of temperature the percentage of cross-linking concentration, comparing the calculated cross-linking concentration percentage with a predetermined percentage, and terminating the cure upon a match thereof.

2. A method according to claim 1 wherein the step of measuring a function of the temperature of the rubber is accomplished by inserting a temperature sensitive probe in the rubber.

3. A method according to claim 2 wherein the temperature sensitive probe is a thermistor.

4. A method according to claim 2 wherein the rubber is being cured in a closable mold and the temperature sensitive probe is inserted in the rubber after the closing of the mold

5. A method according to claim 1 wherein the induction reaction period is calculated by taking the integral of the Arrhenius expression $e^{\alpha_x(1/T_0-1/T)}$ where $\alpha_i$ is the induction activation energy divided by the universal gas constant, $T_o$ is a preselected test temperature and T is the measured temperature of the rubber.

6. A method according to claim 1 wherein the step of calculating the percentage of cross-link concentration includes taking the integral of the Arrhenius expression $e^{\alpha_i(1/T_0-1/T)}$ where $\alpha_x$ is the cross-link activation energy divided by the universal gas constant, $T_o$ is a preselected test temperature, and T is the measured temperature of the rubber, the integral being divided by $\tau_{xo}$, the cross-linking time constant.

7. A method according to claim 6 wherein the step of calculating the cross-link concentration includes solving the equation $a = 1 - e^{-x}$ where $x$ equals the integral as divided by $\tau_{xo}$ to determine the percent cross-link concentration.

8. A method according to claim 1 wherein the steps of calculating the induction reaction period and calculating the percentage of cross-link concentration include taking the integral of the Arrhenius expression $e^{\alpha(1/T_0-1/T)}$ where $T_o$ is a preselected test temperature, T is the measured temperature of the rubber and $\alpha$ is the activation energy divided by the universal gas constant, different activation energies being selected to calculate the induction reaction period and percentage of cross-link concentration.

9. Apparatus for controlling the cure of a rubber article according to the cross-link concentration thereof, said cure including an induction reaction period wherein essentially no change in the mechanical properties of the rubber occurs and a cross-linking reaction period wherein cross-linking of the rubber occurs comprising, temperature sensitive probe means insertable into the rubber article to provide an output signal proportional to a known function of the temperature of the rubber, circuit means receiving said output signal of said probe means and developing a signal proportional to the rate of cure of the induction period of the rubber article, means to integrate said signal proportional to the rate of cure of the induction period and providing an output signal proportional to the induction time period, first comparator means receiving said output signal of said means to integrate and an input signal proportional to a preselected value of induction time and providing an output signal upon a match thereof, said output signal of said first comparator means enabling said circuit means to develop a signal proportional to the rate of cure of the cross-linking period of the rubber article to be integrated by said means to integrate, means receiving said signal proportional to the integrated rate of cure of the cross-linking period and converting the same to a percent cross-link concentration signal, and second comparator means receiving said percent cross-link concentration signal and an input signal proportional to a preselected value of percent cross-link concentration and providing an output signal upon a match thereof to terminate the cure.

10. Apparatus according to claim 9 wherein said probe means is a thermistor.

11. Apparatus according to claim 9 wherein the output signal of said probe means is an analog signal and including means to convert said analog signal to a digital signal.

12. Apparatus according to claim 11 wherein said means to integrate includes a digital adder, a buffer register, a clock pulse generator, and a counter.

13. Apparatus according to claim 9 wherein said circuit means also receives a signal proportional to a predetermined value for induction activation energy so that said signal proportional to the rate of cure of the induction period of the rubber article can be developed by said circuit means.

14. Apparatus according to claim 13 wherein said output signal of said first comparator means prohibits said circuit means from receiving said signal proportional to a predetermined value for induction activation energy and permits said circuit means to receive a signal proportional to a predetermined value for cross-linking activation energy so that said signal proportional to the rate of cure of the cross-linking period can be developed by said circuit means.

15. Apparatus according to claim 9, said output signal of said first comparator means enabling said circuit means to develop a signal proportional to the rate of cure of the cross-linking period by enabling a signal proportional to a predetermined value for cross-linking activation energy to be received by said circuit means.

16. Apparatus according to claim 15, said output signal of said first comparator means also enabling the output signal of said means to integrate to be divided by a predetermined cross-linking time constant.

17. Apparatus according to claim 16 wherein said means to integrate includes a counter and said output signal of said first comparator resets said counter.

* * * * *

UNITED STATES PATENT OFFICE

CERTIFICATE OF CORRECTION

Patent No. 3,819,915 Dated June 25, 1974

Inventor(s) Thomas W. Smith

It is certified that error appears in the above-identified patent and that said Letters Patent are hereby corrected as shown below:

Column 8, line 3, "$e^{\alpha x}$" should read --$e^{\alpha i}$--; line 10, "$e^{\alpha i}$" should read --$e^{\alpha x}$--.

Signed and sealed this 3rd day of December 1974.

(SEAL)
Attest:

McCOY M. GIBSON JR.
Attesting Officer

C. MARSHALL DANN
Commissioner of Patents